(12) United States Patent
Krackhardt et al.

(10) Patent No.: US 8,482,164 B2
(45) Date of Patent: Jul. 9, 2013

(54) BUOYANT HARBOR POWER SUPPLY

(75) Inventors: Ernst-Christoph Krackhardt, Schenefeld (DE); Hans Bernhard Müller-Schwenn, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 403 days.

(21) Appl. No.: 12/740,359

(22) PCT Filed: Sep. 8, 2008

(86) PCT No.: PCT/EP2008/061849
§ 371 (c)(1),
(2), (4) Date: Apr. 29, 2010

(87) PCT Pub. No.: WO2009/056380
PCT Pub. Date: May 7, 2009

(65) Prior Publication Data
US 2010/0308648 A1  Dec. 9, 2010

(30) Foreign Application Priority Data

Nov. 2, 2007 (DE) .......................... 10 2007 052 882
Jul. 4, 2008 (DE) .......................... 10 2008 031 698

(51) Int. Cl.
*B60L 1/00* (2006.01)
(52) U.S. Cl.
USPC .............................. 307/151; 307/9.1; 307/150
(58) Field of Classification Search
USPC .......................................... 307/150, 151, 9.1
See application file for complete search history.

(56) References Cited

U.S. PATENT DOCUMENTS

| 3,602,730 A | 8/1971 | Cushing |
| 3,910,381 A | 10/1975 | Burckhalter |

(Continued)

FOREIGN PATENT DOCUMENTS

| CH | 531127 A | 11/1972 |
| DE | 1588462 A1 | 12/1970 |

(Continued)

OTHER PUBLICATIONS

Diploma of Pamela Brieske, Mar. 21, 2007, front page and p. 56, in German and English language.

(Continued)

*Primary Examiner* — Hal Kaplan
(74) *Attorney, Agent, or Firm* — Harness, Dickey & Pierce, P.L.C.

(57) ABSTRACT

At least one embodiment of the invention relates to supplying ships in a harbor with external energy in order to prevent the formation of soot and CO2. For this purpose it is already known to supply ships with power from the wharfage. One problem in such a power supply provided from the wharf is that differences in the harbor's water level must be balanced for the power supply of a ship in the harbor. Furthermore, the operational readiness of such a power supply on land may be adversely affected, such as in the case of high water. At least one embodiment of the invention proposes a buoyant harbor power supply, e.g. the components of the harbor power supply are disposed on or in a buoyant device, particularly a barge.

20 Claims, 6 Drawing Sheets

U.S. PATENT DOCUMENTS

Figure 1:
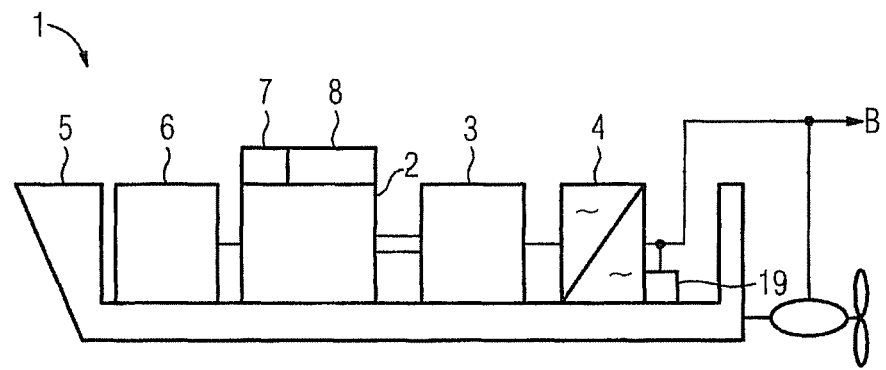

| | | | |
|---|---|---|---|
| 4,476,798 | A | 10/1984 | Backus |
| 4,992,669 | A | 2/1991 | Parmley |
| 5,920,467 | A | 7/1999 | Bowyer et al. |
| 5,969,435 | A * | 10/1999 | Wilhelm ............... 307/64 |
| 6,624,533 | B1 * | 9/2003 | Swanson et al. .......... 307/64 |
| 7,047,899 | B2 * | 5/2006 | Laurilehto et al. ........ 114/248 |
| 7,119,460 | B2 * | 10/2006 | Poldervaart et al. ........ 307/149 |
| 7,122,913 | B2 | 10/2006 | Markle |
| 7,172,474 | B2 | 2/2007 | Rzadki et al. |
| 8,036,000 | B2 * | 10/2011 | Ying et al. ............. 363/21.02 |
| 2006/0243186 | A1 | 11/2006 | Park |
| 2006/0254281 | A1 | 11/2006 | Badeer |
| 2006/0260315 | A1 | 11/2006 | Park |
| 2006/0283802 | A1 | 12/2006 | Gordon |
| 2007/0108039 | A1 * | 5/2007 | Neubauer et al. ............ 204/164 |

FOREIGN PATENT DOCUMENTS

| | | |
|---|---|---|
| DE | 2211927 A1 | 9/1973 |
| DE | 3733323 A1 | 4/1989 |
| DE | 3741407 A1 | 6/1989 |
| DE | 20213341 U1 | 3/2003 |
| DE | 10231152 | 2/2004 |
| DE | 10336792 A1 | 3/2005 |
| DE | 202004006532 U1 | 9/2005 |
| EP | 1512618 A2 | 3/2005 |
| GB | 1166197 | 8/1967 |
| GB | 1139499 A | 1/1969 |
| GB | 2405742 A | 3/2005 |
| JP | 3031098 A | 11/1972 |
| JP | 2003-252294 | 9/2003 |
| JP | 2007118925 A | 5/2007 |
| WO | WO 2007060189 A1 | 5/2007 |

OTHER PUBLICATIONS

Terra Marique_European Shipping_Transport Engineering: "Power Barges" http://www.terra-marique.net/power-barges; Others.

"Alternator synchronization", from Wikipedia http://en.wikipedia.org/wiki/Alternator_synchronization, printed Jul. 6, 2011; Others.

German Office Action dated Jul. 18, 2011.

Cold Ironing—Exteme Stromversorgung für Schiffe im Hafen, Diplomarbeit von Pamela Brieske, Mar. 21, 2007, Seiten 1 bis 110; Others; 2007.

"WAK power barge will deliver 450 MW for Pakistan", Snyder, G: et al., Powerful Solutions for Power Generation worldwide, Aug. 1996, pp. 65 to 69; Others; 1996.

"Power plants to go", Valenti, M., Mechanical Engineering, May 1996, pp. 62 to 66; Others; 1996.

"Barge mounted diesels add 200 MWe to Mindanao grid", Christensen, B., Modern Power Systems, Jul. 1994, p. 3 to 7; Others; 1994.

"Pollution prevention at ports: clearing the air", Bailey, D. et al., Environmental Impact Assessment Review, vol. 24, Aug. 2004, p. 749 to 774; Others; 2004.

"Challenges of Connecting Shipboard Marine Systems to Medium Voltage Shoreside Electrical Power", Khersonsky, Y. et al., IEEE 2005, p. 133 to 140; Others; 2005.

"Lady of Victories", Gentile, F., ABB Review Jan. 2008 , p. 67 to 70; Book; 2008.

Dubbel, Taschenbuch für den Maschinenbau, 19. Auflage, Beitz, W. et al., Springer-Verlag, pp. D22, L27 and L28; Book.

Extract from Wikipedia "Synchronization (alternating current)" pp. 1 to 5; Others.

* cited by examiner

BUOYANT HARBOR POWER SUPPLY

PRIORITY STATEMENT

This application is the national phase under 35 U.S.C. §371 of PCT International Application No. PCT/EP2008/061849 which has an International filing date of Sep. 8, 2008, which designates the United States of America, and which claims priority on German patent application numbers DE 10 2007 052 882.7 filed Nov. 2, 2007 and DE 10 2008 031 698.9 filed Jul. 4, 2008, the entire contents of each of which are hereby incorporated herein by reference.

FIELD

At least one embodiment of the invention generally relates to a floating harbor power supply for ships. At least one embodiment of the invention also generally relates to a system for supply to and/or disposal from ships in harbor.

BACKGROUND

Importance is increasingly being placed on reduced emissions in harbors throughout the world. This also applies to ship movement. Nowadays, it is normal practice for ships to produce their electricity requirement in harbor using their own electricity producing equipment, generally one or more diesel generator or generators. Since these machines were optimized to burn heavy diesel oil, that is to say HFO, and in some cases also burn marine diesel oil, that is to say NDO, in harbor, these diesel generators produce amounts of soot, $NO_x$, $CO_2$ and $SO_x$ which should not be underestimated.

In order to prevent such, soot, $NO_x$, $CO_2$ and $SO_x$ formation, EU Guidelines 1999/32/EG and 93/12/EG have discussed ships in harbor being supplied with external energy. In this context, it is already known for ships to be supplied with electricity from the quay installation (frequently also referred to as "Cold Ironing").

By way of example, U.S. Pat. No. 7,122,913 B2 discloses a modular harbor electricity supply for ships in harbor, which supply can be moved along the quay.

One problem with an electricity supply from the quay such as this is that it is necessary for the electricity supply to a ship in harbor to compensate for differences in the water level and the load level of the ship in harbor. Furthermore, the readiness of such a harbor power supply to operate from the quay may be adversely affected, for example at high tide.

SUMMARY

At least one embodiment of the present invention therefore specifies a harbor power supply for ships which allows the abovementioned problems to be substantially avoided.

At least one embodiment is directed to a floating (or floatable) harbor power supply for ships, that is to say all the components of the harbor power supply are arranged on or in a floating device, in particular a barge.

A floating harbor power supply can move itself with the water level in the same way as a ship in harbor, as a result of which there is no need to compensate for differences in the water level. Only differences in the load state of a ship need be compensated for. Furthermore, this also ensures that the harbor power supply can operate at high tide. A floating harbor power supply, particularly when it is in the form of a barge, can also be moved easily and—for example in the event of a catastrophe—can also be used to feed electricity into shore-based electricity supply company grid systems.

A further advantage is that power supply companies need not provide services for ship connection (expensive lines, which are not used all the time). Furthermore, the investment for a floating harbor power supply such as this may be less than for a shore-based power supply, since it can be arranged on the quay, protected against flooding in the event of storms. For example, it will be possible to generate a price for every kWh emitted from the floating harbor power supply whose proceeds will be split to provide 20% to the harbor operator, 2% to the power supply company (in respect of electricity obtained from the shore) and 60% to the financer of the floating harbor power supply.

The components of the harbor power supply on board the floating device include, for example, generators, transformers, converters, cables, cable drums, controllers and plug connectors. The floating harbor power supply is preferably able to supply electricity at a voltage/frequency of 6.6 kV/60 Hz, 440 V/60 Hz and 380 V/50 Hz.

In principle, in addition to supplying electricity to ships in harbor, the floating harbor power supply can be used to supply electricity to ships or other devices which are located or are lying in sounds or close to coasts or shores.

In order to produce electricity, the harbor power supply may comprise an internal combustion engine and a generator driven by the internal combustion engine. For example, it is possible to use very modern motor-generator sets with a power of 2-5 MW.

The internal combustion engine is preferably operated using low-sulfur fuels, biofuels or natural gases. If diesel fuel is used, it is advantageous to use diesel fuel with a maximum sulfur content of 0.1%. Particularly in the case of elderly ships, this makes it possible to comply with the emission limit values for ships in European Community harbors as required by EU Directives 1999/32/EG and 93/12/EG, from Jan. 1, 2010, thus ensuring their electricity supply in harbor without any need for major conversion work on the pier or in the ships. All that need be provided in the ships themselves is appropriate electricity connection apparatuses which, however, also have to be provided for a shore-based electricity supply (Cold Ironing).

The harbor power supply advantageously also comprises a heat coupling device for transmission of heat from the exhaust gases of the internal combustion engine to a fluid, in particular water, and for supplying ships with the heated fluid. Ships in harbor can then additionally be supplied with steam or hot water, for example, from the floating harbor power supply. By way of example, this makes it possible to shut down auxiliary ship boilers that are operated using heavy oil, during the time when the ship is stationary. However, one particular advantage is also that a thermal power concept such as this makes it possible to achieve higher fuel utilization efficiency than when electricity is supplied from the shore.

In addition, the harbor power supply preferably also comprises a device for cleaning the exhaust gases of the internal combustion engine. This makes it possible to keep emissions ($CO_2$, $NO_x$, CO, PM/soot) low. Appropriate technologies (for example SCR) are already available. Alternatively, for example, it is also possible to use stable $H_2O$ diesel-oil emulsions.

Alternatively or additionally, the floating harbor power supply may also comprise fuel cells for electricity production.

Alternatively or additionally, the harbor power supply may also comprise solar cells for electricity production.

The harbor power supply preferably comprises a converter for matching the voltage, frequency and phase angle of the electric current produced by the harbor power supply to the voltage, frequency and phase angle of the on-board power supply system or of some other load on a ship in harbor.

By way of example, this can be connected on the input side to an electricity generator, and can be connected on the output side to the on-board power supply system or to the other load on the ship in harbor.

The electricity generator and the converter may also be used to cover the electricity demand on board the floating harbor power supply, for example during times when the floating harbor power supply is moving and is stationary, when no ship need be supplied with electricity. According to one particularly advantageous refinement, the converter is therefore also used to feed the electrical power that is produced to an electric drive motor, for example a steerable propeller, for propulsion of the floating harbor power supply. The converter then matches the voltage and frequency of the electrical power produced by the harbor power supply to the voltage and frequency required for the electric drive motor.

When electricity is being supplied to a ship on-board power supply system, the harbor power supply advantageously comprises a device for detection of the voltage, frequency and phase angle of the ship on-board power supply system. When using a converter as mentioned above, the device for detection of the voltage, frequency and phase angle of the on-board power supply system may, for example, be integrated in the converter, and may measure the voltage, frequency and phase angle of the on-board power supply system, at the converter outputs.

At least one embodiment of the invention is directed to a system for supply to and/or disposal from ships in harbor.

The system according to at least one embodiment of the invention comprises at least one barge with a floating (or floatable) hull, which is designed independently of the task, and a plurality of function modules for different supply and/or disposal tasks, which are configured such that they can be combined depending on the supply and/or disposal task and can be installed on or in the floating hull of the at least one barge, wherein the function modules comprise at least one electricity producing module for supplying power to ships in harbor.

A barge on whose hull an electricity producing module such as this is installed likewise represents a floating harbor power supply with the advantages explained above. In this case, the electricity producing module may comprise one or more of the components mentioned above in the context of the floating harbor power supply, for electricity production, electricity conversion, heat coupling, exhaust-gas cleaning and detection of the voltage and frequency of the on-board power supply system, and can exploit the advantages which can be achieved therefrom. Furthermore, however, numerous further other advantages can be achieved by the system according to at least one embodiment of the invention.

In this case, the fundamental idea is that, in addition to the electricity demand, there is a considerable additional supply and disposal demand for various media for ships in harbor. By way of example, these include gray water and black water, and possibly also oil sludge.

A barge such as this can therefore be used for various supply and/or disposal tasks.

In this case, a function module comprises all the major components which are required to fulfill its function (for example electricity supply, gray-water disposal, etc.).

The dimensions and the nature and arrangement of the connecting and attachment technology to the floating hull are preferably uniform and standardized for the function modules.

The function modules preferably have a transport container format, and/or are in the form of a transport container. All that is then necessary for function modules designed in this way is to ensure a safe-operating installation in or on the barge (for example with regard to mounting, space, etc.).

The hull is preferably prepared with the necessary pipelines and cable ducts, and for accommodation of such containerized function modules.

The function modules may comprise at least one fuel module (for example in the form of a tank) for supplying fuel to the electricity producing module.

In order to accommodate gray way and/or black water from a ship, the function modules may also comprise at least one waste-water accommodation module (for example in the form of a tank).

In order to clean gray-water or black-water disposal devices on board a ship, the function modules may furthermore also comprise at least one cleaning module.

If the fresh water is intended to be obtained directly from sea water or river water, the function modules may also comprise at least one fresh-water producing module.

In order to store and emit fresh water to a ship or in order to store sea water, the function modules may also comprise a water storage module (for example in the form of a tank).

Furthermore, the function modules may comprise at least one drive module for (preferably electrical) propulsion of the barge, and a control station module for presetting the direction of movement and speed of a barge which is driven by a drive module.

In addition to supply to and/or disposal from ships in harbor, a system according to the invention can in principle also be used for supply to and/or disposal from ships or other devices which are located or are lying in sounds or close to coasts or shores.

For example, it is thus feasible to equip a barge as a tugboat with one or two drive modules and possibly a fuel module as well as a control station module, and to move a power supply barge with an electricity producing module and a fuel module (for example using LNG as fuel) to a ship, where it supplies electrical power to the ship by means of this energy source, which produces little environmental pollution.

The tug barge then collects a disposal barge, which is equipped with modules for gray-water and black-water disposal and cleaning, and moves this to the ship. The disposal barge is subsequently collected again by the tug barge from the ship. The disposal barge can then be converted to a fuel supply barge, and the waste-water accommodation and cleaning modules are passed on for regular maintenance. If a tug is available, the tug barge can also be converted to a pure power supply barge if, for example, dike work is being carried out, for example, on the waterfront and pumps and electrical machines must be supplied with electricity. At the same time, two barges with fresh-water producing modules and fresh-water storage modules could be prepared for deployment to third-world countries, where they should ensure the water supply for neighboring states for 2 years.

The systems comprise individual modules, matched to one another, with standardized interfaces, which allow rapid and problem-free conversion. Advantageous and optimized services are provided in this way.

The fundamental design of a modular barge is preferably subdivided into:
a) the barge itself as a marine body with a floating hull and with a plurality of accommodation spaces for standardized, in particular containerized, function modules, and b) one or more standardized, in particular containerized, function modules, which are designed such that they can be mounted on the accommodation spaces.

The accommodation spaces on the barge are in this case likewise advantageously standardized, that is to say they have a standardized height, width and depth and standardized attachment devices on their bottom surface and/or side surface for the attachment of the function modules.

The function modules may also have standardized attachment means for mounting a function module on or under, or attaching it to, another function module.

The intelligence of the overall system is advantageously distributed between the containers which, because of the modularity, can also be replaced if required. The containers may also contain different function modules, which may be used as required, and may be kept and prepared for operation at a central point on the shore. If required, these modules can also be operated on shore from goods vehicles or trains. For example, an electricity producing module can also be used in the event of a catastrophe, with or without a barge. The major advantage in this case is the flexibility.

The floating harbor power supply preferably comprises a converter whose frequency and voltage can be controlled and which can be connected via a switchable electrical line to a ship in harbor. This therefore makes it possible to ensure that electricity is transmitted to a ship at all times without any problems without any need to provide a large number of electrically differently equipped ship connections on board the floating harbor power supply.

The converter is advantageously designed such that it can convert any desired input voltages and frequencies to voltages and frequencies which currently exist in the on-board power supply system of a ship in harbor. On-board power supply systems are also subject to certain fluctuations in their voltage and in their frequencies. Until now, it has therefore been necessary for the voltage and frequency on board to correspond to the voltage and frequency of the harbor power supply. The on-board power supply system therefore always had to be matched to the harbor power supply parameters. This is not the case when the converter is able to dynamically compensate for differences in the voltage and frequency. It is therefore sufficient to simply switch on the harbor power supply, with the output part of the converter being matched to the respective frequency, voltage and phase angle of the on-board power supply system, in order to supply electrical power to the ship in harbor. There is no longer any need to synchronize the on-board power supply system to the harbor power supply, that is to say to change the on-board frequency and voltage to the harbor power supply values, and this is highly advantageous.

The converter particularly advantageously has an open-loop and closed-loop control device which appropriately adapts the power output and keeps the frequency stable when there is a change in the power demand on the output side, which is evident in a tendency for the frequency to change. It is therefore very advantageously possible to ensure that, after the harbor power supply has been switched on, the load can be removed from the energy generators on board the ship and they can be switched off, without any frequency and voltage changes occurring in the on-board power supply system. The connection of additional loads, for example for the purposes of the so-called hotel load and the so-called auxiliary operation, also does not influence the voltage and frequency of the on-board power supply system. Controlled by the frequency tendency, the converter keeps the frequency and voltage in the on-board power supply system stable without any need for action by the crew of the ship after the converter has been switched on.

In this case, the converter has open-loop and closed-loop control components, in particular software-based components, which react to a voltage drop or a voltage rise in the on-board power supply system by increasing or decreasing the frequency, for example by connecting or disconnecting generators or loads. The converter in the harbor power supply can therefore have an advantageous effect on the on-board power supply system.

It is also advantageous for the shore connection converter to have a closed-loop control device which allows four-quadrant operation. This allows particularly advantageous operation of the harbor power supply.

A wide range of different types of converter may be used. A PWM converter is particularly advantageous, on one side of which the electricity produced by the harbor power supply can be tapped off, with its voltage and frequency, and whose other side then produces the on-board electricity for the ship in harbor, at the required voltage and frequency.

A converter using intermediate-circuit technology is furthermore highly advantageous, particularly when it has a reactive-current compensating component in the closed-loop control. Two parts which are subject to open-loop and closed-loop control independently of one another, and between which electrical power is transferred, are provided internally for this purpose.

DETAILED DESCRIPTION OF THE DRAWINGS

Figure 3:
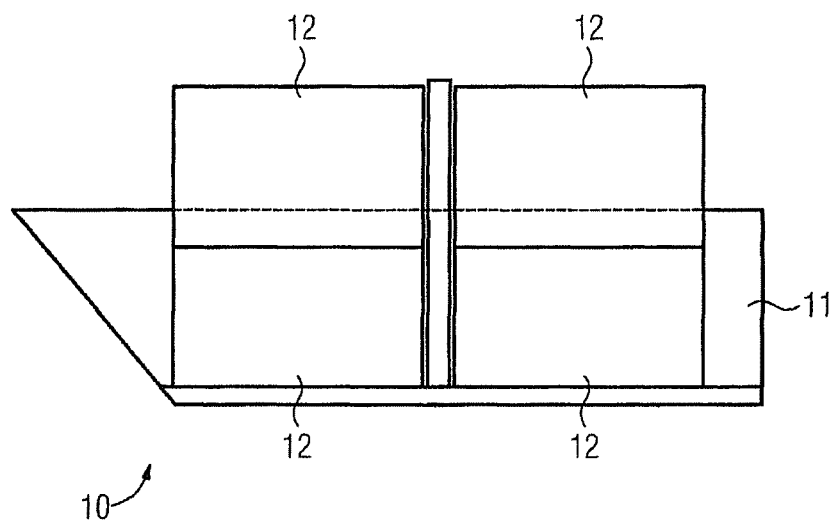
Figure 2:
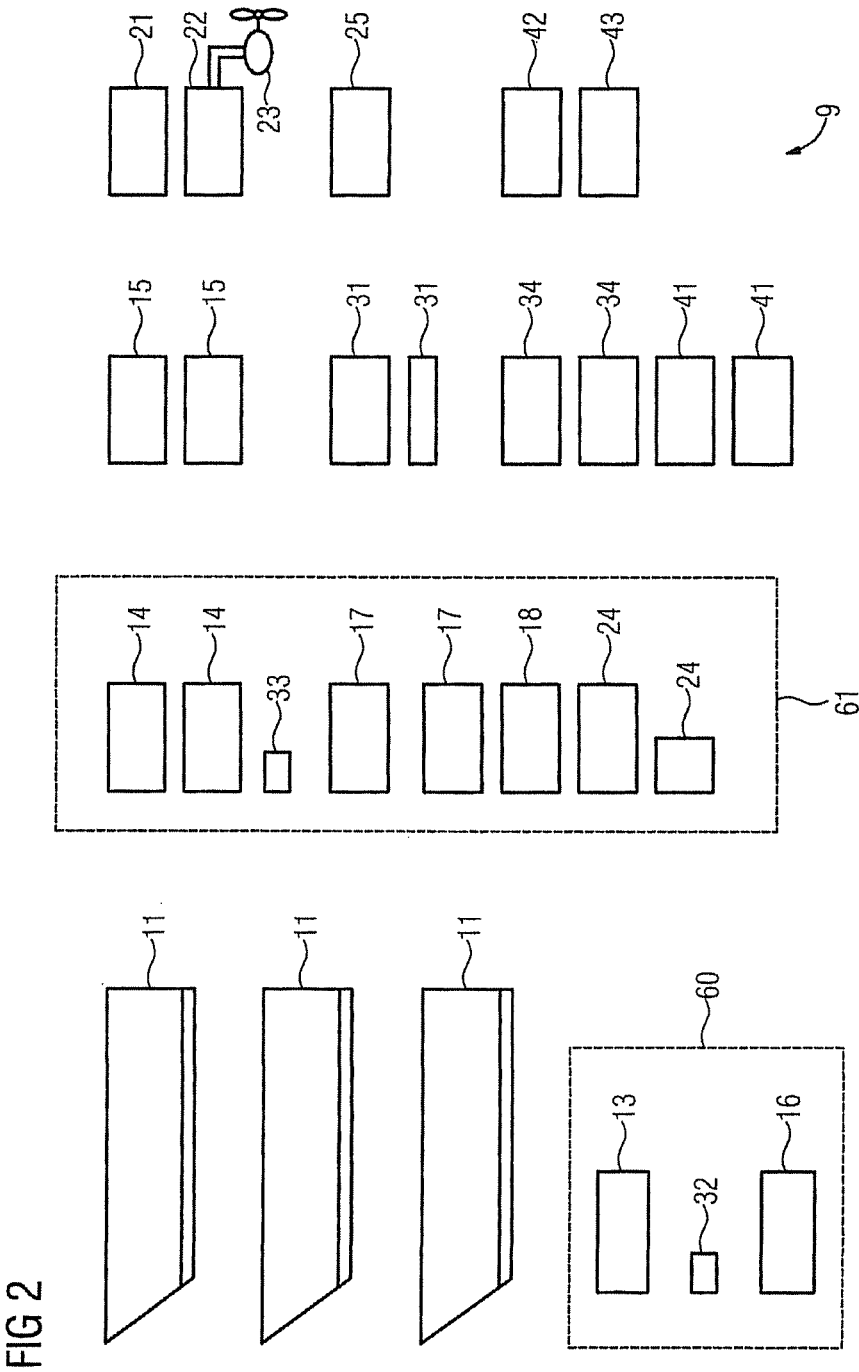
Figure 4:
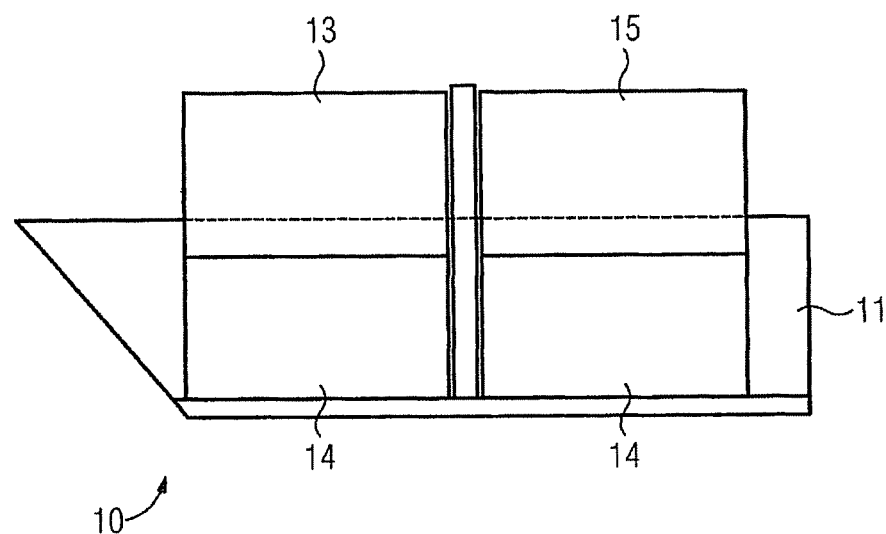
Figure 5:
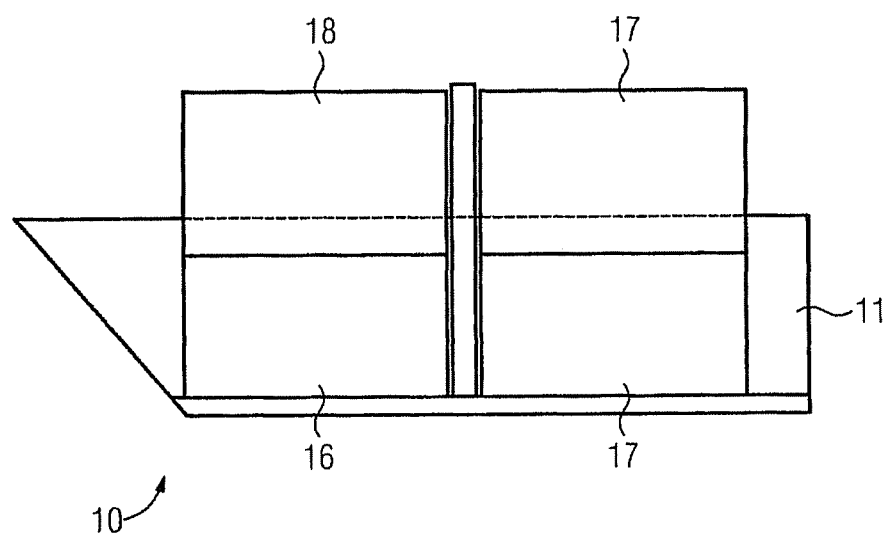
Figure 6:
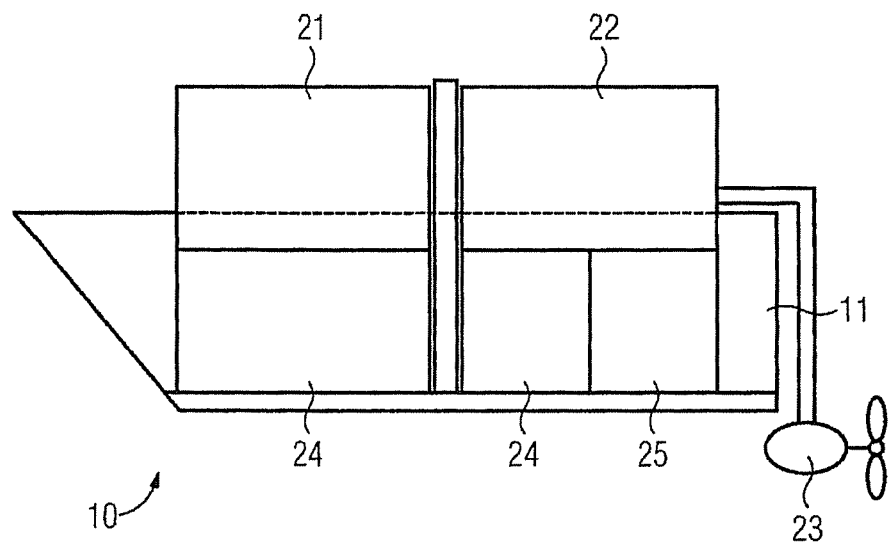
Figure 7:
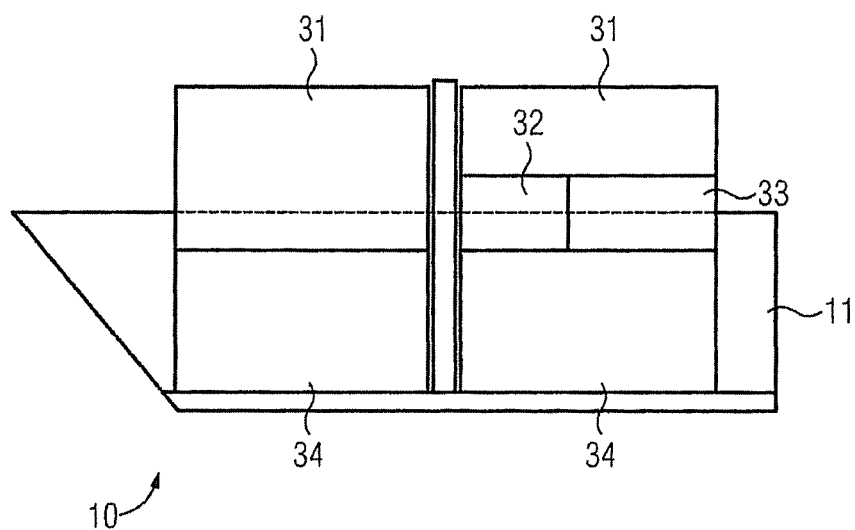
Figure 8:
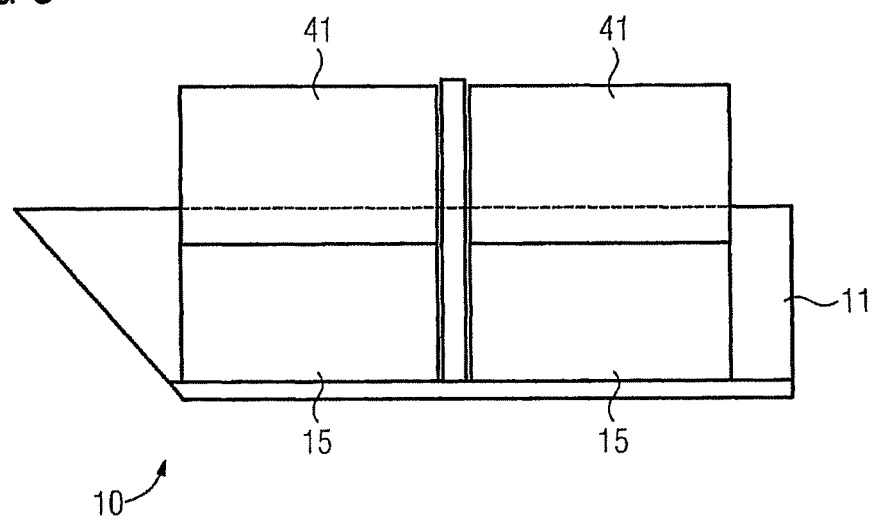
Figure 9:
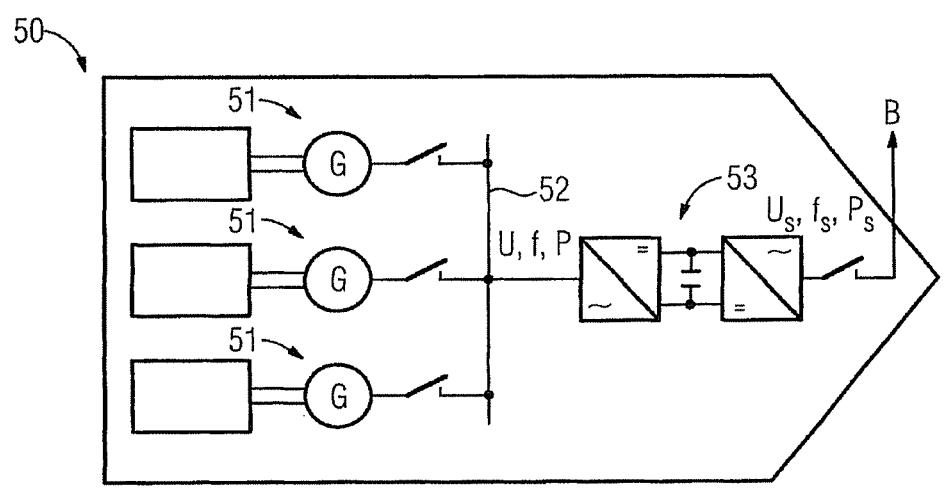
Figure 10:
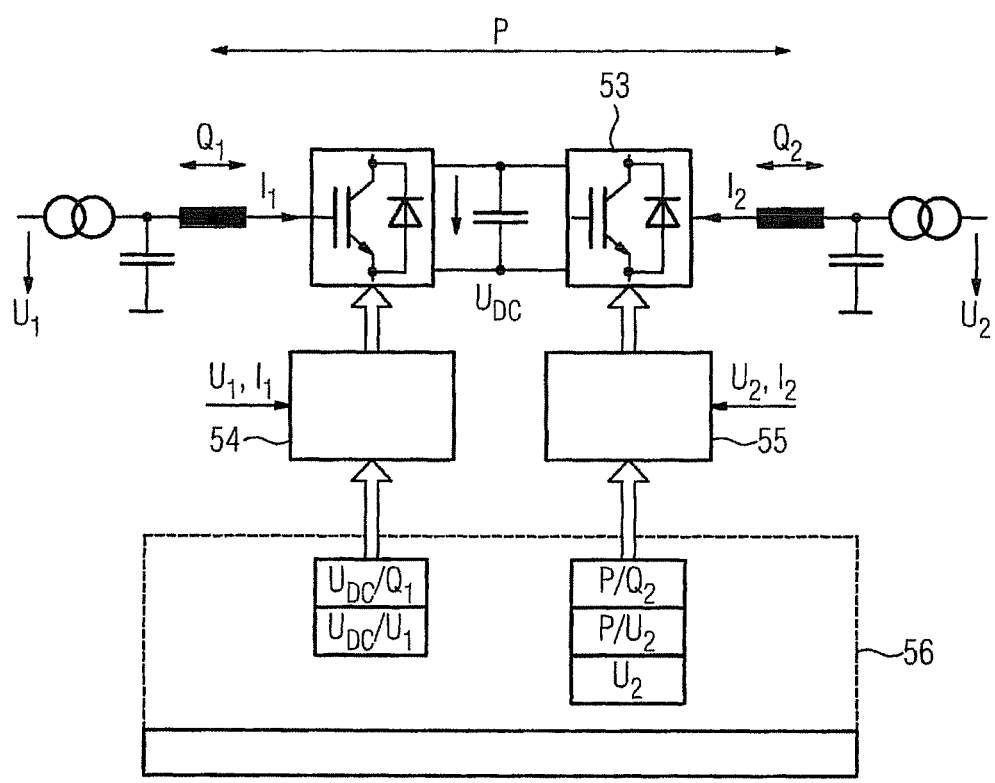

The invention and further advantageous refinements of the invention according to features of the dependent claims will be explained in more detail in the following text with reference to example embodiments in the figures, in which:

FIG. 1 shows a longitudinal section through a floating harbor power supply,

FIG. 2 shows an outline illustration of a modular system for supply to and/or disposal from ships in harbor, FIG. 3 shows the basic design of a modular service barge assembled with the aid of the system shown in FIG. 2, FIG. 4 shows a first configuration of a modular service barge as a floating harbor power supply, FIG. 5 shows a second configuration of a modular service barge as a floating harbor power supply, FIG. 6 shows a configuration of a modular service barge as a tugboat or tug, FIG. 7 shows a configuration of a modular service barge as a fresh-water generator, FIG. 8 shows a configuration of a modular service barge as a gray-water and black-water disposal device/module, FIG. 9 shows a floating harbor power supply with its major electrical components on board, and FIG. 10 shows one particularly advantageous refinement of the converter shown in FIG. 9.

DETAILED DESCRIPTION OF THE EXAMPLE EMBODIMENTS

FIG. 1 shows a longitudinal section through a floating harbor power supply 1 with an internal combustion engine 2, a generator 3 driven by the internal combustion engine 2, and a converter 4 for matching the voltage and frequency of the electricity produced by the generator 3 to the voltage and frequency of the on-board power supply system B of a ship in harbor. These components are arranged in or on a floating device 5, in particular a barge. The harbor power supply furthermore includes a tank 6 for storage of fuel for the internal combustion engine 2, an exhaust-gas treatment device 7 for cleaning the exhaust gases from the internal combustion engine 2, a heat coupling device 8 for transmitting heat from the exhaust gases of the internal combustion engine 2 to water and for supplying ships with steam or hot water, and a device 19 for detection of the voltage, frequency and phase angle of the on-board power supply system B of a ship. By way of example, the floating harbor power supply 1 may be propelled with the aid of a steerable propeller 23, which can likewise be supplied with electricity via the converter 4 from the generator 3.

FIG. 2 shows an outline illustration of a system 9 for supply to and/or disposal from ships in harbor, having a plurality of barges 11, each having a floating hull, which is configured independently of the task, and having a plurality of function modules for different supply and disposal tasks, which are configured such that they can be combined depending on the supply and/or disposal task and can be installed on the floating hull of the barges 11.

In this case, the function modules comprise a group 60 of electricity producing modules which, in detail, comprise a generator module 13 with a diesel generator, and a fuel cell module 16 for producing electricity for a ship, and a generator module 32 with a diesel generator for producing electricity for a fresh-water producing module 31. The generator module 13 in this case advantageously also comprises a heat coupling device, as has already been described above.

The function modules furthermore comprise a group 61 of fuel modules which, in detail, comprise two fuel modules 14 for storage of fuel (for example LNG, LPG or diesel fuel) for the generator modules 13, as well as two hydrogen storage modules 17 and an oxygen storage module 18 for the fuel cell module 16. Furthermore, the group 61 of fuel modules comprises two fuel modules 24 for storage of fuel for a drive module 22, and a fuel module 33 for storage of fuel for the generator module 32.

In addition, the function modules comprise:
a plurality of gray-water accommodation modules 15 for accommodation of gray water from a ship,
a plurality of fresh-water producing modules 31,
a plurality of water storage modules 34 for storage of fresh water and/or sea water,
a plurality of black-water accommodation modules 41 for accommodation of black water from a ship,
a drive module 22 with a steerable propeller 23 for propulsion of a barge 11,
a control station module 21 for presetting the direction of movement and speed of a barge 11 driven by a drive module 22,
a sludge accommodation module 25,
a cleaning module 42 for cleaning gray-water or black-water disposal devices on board a ship,
a refuse collection module 43 for collection of refuse from ships, and for passing this on at a recycling station.

In this case, the system can be used not only for supply to and/or disposal from ships in harbor but, furthermore in principle, can be used for supply to and/or disposal from ships and other facilities in sounds or close to a shore or coast.

FIG. 3 shows a longitudinal section through the basic design of a modular service barge 10 which is assembled with the aid of the system 9 shown in FIG. 2. The modular service barge 10 comprises the actual barge 11, that is to say a floating marine body with accommodation spaces for standardized, in particular containerized, function modules 12, and one or more such standardized, in particular containerized, function modules 12.

FIG. 4 shows a configuration of a modular service barge 10 as a floating harbor power supply with the capacity to accommodate gray water from a ship in harbor, for subsequent treatment on shore. The service barge 10 for this purpose comprises a generator module 13, two fuel modules 14 for storing fuel (for example LNG, LPG, diesel fuel) for the generator module 13, and a gray-water accommodation module 15.

FIG. 5 shows a configuration of a modular service barge 10 as a floating harbor power supply with fuel cells. For this purpose, the service barge 10 comprises a fuel cell module 16 for electricity production, two hydrogen storage modules 17 for storage of hydrogen, and an oxygen storage module 18 for storage of oxygen.

FIG. 6 shows a configuration of a modular service barge 10 as a tugboat or tug. The service barge 10 for this purpose comprises a control station module 21, a drive module 22 for propulsion of the barge 10, for example by means of a steerable propeller 23, two fuel modules 24 for storage of fuel for the drive module 22, and a sludge module 25. This allows a service barge to be reconfigured as a tug as required, and to deploy other service barges in the harbor to the various destinations.

FIG. 7 shows a configuration of a modular service barge 10 as a fresh-water producer with two fresh-water producing modules (sea-water desalination modules) 31, a generator module 32 for producing electricity for the fresh-water producing module 31, a fuel module 33 for storage of fuel for the generator module 32, and two water storage modules 34 for storage of fresh water that is produced. By way of example, a barge such as this can be used as a fresh-water producer on coasts where there is little drinking water (for example the Red Sea, the Persian Gulf, etc.). The barge can be towed in clean sea water and can generate fresh water, and can output this to appropriately equipped tankers (or tank barges in the towed group) in exchange for fuel, or can in each case be towed back to the harbor when the barge sends the "full" signal, and can output the water there for example to ships in harbor.

FIG. 8 shows a configuration of a modular service barge 10 as a gray-water and black-water disposal means having two black-water accommodation modules 41 and two gray-water accommodation modules 15. The barge accommodates gray water and black water from a ship in harbor, for subsequent treatment on shore. A configuration for sludge transfer with the aid of specific modules is likewise feasible.

FIG. 9 shows a floating harbor power supply 50 with its major electrical components on board. In the case of the modular service barge illustrated in FIG. 4, these components would be located in one or more generator modules 13. There are one or more diesel generator sets 51 in the floating harbor power supply 50, which individually or jointly feed electricity into an electrical power supply system 52 (by way of example, there are three diesel generator sets 51 in the case of the floating harbor power supply 50 shown in FIG. 9). The electricity in the electrical power supply system 52 has a voltage U, a frequency f and a phase angle P which are specific to that electrical-power supply system. However, electricity at a voltage $U_s$, frequency $f_s$ and with a phase angle $P_s$ is required for the on-board power supply system B or for an electrical load in a ship in harbor. The input side of a converter 53 is connected to the electrical power supply system 52, and its output side is connected to the on-board power supply system B or the load in the ship, and the converter 53 therefore converts the electricity at the voltage U, frequency f and phase angle P of the electrical power supply system 52 to electricity at the voltage $U_s$, frequency $f_s$ and phase angle $P_s$ of the on-board power supply system B or load in the ship.

FIG. 10 shows a particularly suitable converter 53, to whose input side the voltage U1 is applied, while the voltage U2 is produced on the other side. The converter, which is illustrated in the conventional manner, has an intermediate circuit, with both parts of the converter having an independent regulator. The voltages and currents can therefore be set as required for the schematically illustrated power semiconductors. The converter is annotated 53, while the converter regulators are annotated 54 and 55.

If necessary, the converter also has a further closed-loop control capability, which possibly includes a reactive-current compensation/regulator characteristic. This additional closed-loop converter control is annotated 56 and can be used for power-factor correction. As already stated, a person skilled in the art in the field of converters will know how such converters can be designed from the engineering point of view. The converter with known open-loop and closed-loop control is designed to adjust its open-loop and closed-loop control such that it can process on the input side the output current from the generator or generator set, as in the electrical power supply system 52, while, on the output side, producing a stable electrical supply, in terms of voltage, frequency and phase angle, corresponding to the on-board power supply system state of a ship in harbor.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A floating harbor power supply for the supply of ships in harbor with external power, comprising:
   an internal combustion engine;
   a generator, driven by the internal combustion engine, for producing electricity for the ships; and
   a heat coupling device for transmission of heat from exhaust gases of the internal combustion engine to a fluid, and for supplying ships with the heated fluid.

2. The floating harbor power supply as claimed in claim 1, comprising a barge on or in which all components of the harbor power supply for ships are arranged.

3. The floating harbor power supply as claimed in claim 1, further comprising a device for cleaning the exhaust gases of the internal combustion engine.

4. The floating harbor power supply as claimed in claim 1, comprising at least one of fuel cells and solar cells for producing electricity for the ships.

5. The floating harbor power supply as claimed in claim 1, further comprising a device for detection of voltage, frequency and phase angle of the ship on-board power supply system.

6. The floating harbor power supply as claimed in claim 1, further comprising:
   at least one barge with a floating hull, designed independently of at least one of a supply and disposal task and including a plurality of function modules for different at least one of supply and disposal tasks, the function modules being configured to be combinable depending on the at least one of supply and disposal task and are installable on or in the floating hull of the at least one barge, wherein the plurality of function modules comprise at least one electricity producing module for supplying power to ships in harbor, wherein the electricity producing module includes the internal combustion engine and the generator, driven by the internal combustion engine, for producing electricity for the ships.

7. The floating harbor power supply as claimed in claim 6, wherein the electricity producing module comprises a device for cleaning the exhaust gases of the internal combustion engine.

8. The floating harbor power supply as claimed in claim 6, wherein the electricity producing module comprises at least one of fuel cells and solar cells for producing electricity for the ships.

9. The floating harbor power supply as claimed in claim 6, wherein the electricity producing module comprises a device for detection of the voltage, frequency and phase angle of the ship on-board power supply system.

10. The floating harbor power supply as claimed in claim 6, wherein the plurality of function modules comprise at least one fuel module for supplying fuel to the electricity producing module.

11. The floating harbor power supply as claimed in claim 6, wherein the plurality of function modules comprise at least one waste-water accommodation module for accommodation of at least one of gray water and black water from a ship.

12. The floating harbor power supply as claimed in claim 11, wherein the plurality of function modules comprise at least one cleaning module for cleaning the gray-water or black-water disposal devices on board a ship.

13. The floating harbor power supply as claimed in claim 6, wherein the plurality of function modules comprise at least one cleaning module for cleaning gray-water or black-water disposal devices on board a ship.

14. The floating harbor power supply as claimed in claim 6, wherein the plurality of function modules comprise at least one fresh-water producing module.

15. The floating harbor power supply as claimed in claim 6, wherein the plurality of function modules comprise at least one water storage module for storage of fresh water.

16. The floating harbor power supply as claimed in claim 6, wherein the plurality of function modules comprise at least one drive module for propulsion of the barge, and a control station module for presetting the direction of movement and the speed of a barge which is driven by the drive module.

17. The floating harbor power supply as claimed in claim 6, wherein the plurality of function modules at least one of include a transport container format and are in the form of a transport container.

18. The floating harbor power supply as claimed in claim 1, further comprising a converter for matching voltage, frequency and phase angle of the electricity produced to voltage, frequency and phase angle of an on-board power supply system or of a load on a ship.

19. The floating harbor power supply as claimed in claim 18, wherein the converter is additionally used to feed the electrical power that is produced to an electric drive motor for propulsion of the harbor power supply.

20. The floating harbor power supply as claimed in claim 18, wherein the converter is also used to feed the electrical current that is produced to an electric drive motor for propulsion of the harbor power supply.

* * * * *